United States Patent [19]
Haraikawa

[11] 3,885,392
[45] May 27, 1975

[54] DUAL BRAKE SYSTEM
[76] Inventor: Tetsuo Haraikawa, 5-44-26, Narashinodai, Funabashi-shi, Chiba-ken, Japan
[22] Filed: July 30, 1973
[21] Appl. No.: 383,645

Related U.S. Application Data
[63] Continuation-in-part of Ser. No. 141,316, May 7, 1971, abandoned.

[30] Foreign Application Priority Data
May 9, 1970 Japan.............................. 45-39456
May 26, 1970 Japan............................ 45-45063

[52] U.S. Cl.............................. 60/581; 188/345
[51] Int. Cl............................................ F15b 7/08
[58] Field of Search ............ 60/562, 534, 535, 581; 188/345

[56] References Cited
UNITED STATES PATENTS
3,463,554  8/1969  Bueler.......................... 188/151 A
3,517,782  6/1970  Hayes ................................ 188/345
3,679,030  7/1972  Kawabe ............................. 188/345
3,795,111  3/1974  Haraikawa ........................... 60/581

FOREIGN PATENTS OR APPLICATIONS
951,906  11/1962  United Kingdom................. 188/345

Primary Examiner—Martin P. Schwadron
Assistant Examiner—H. Burks, Sr.
Attorney, Agent, or Firm—Sughrue, Rothwell, Mion, Zinn and Macpeak

[57] ABSTRACT

The invention relates to improvements in and relating to a dual hydraulic brake system comprising two hydraulic systems for braking at least one vehicle wheel by means of at least one hydraulic brake cylinder comprising two independent pressure chambers and an hydraulic piston defining said pressure chambers in cooperation with said cylinder, said chambers being pressurized at different levels during operation of said brake system. A single seal is provided between said two pressure chambers. A sensing device including an alarm is disposed in communication with both systems so as to be responsive to pressure in each system. If fluid leakage occurs past the seal the sensing device will detect the change in relative pressures to active the alarm.

3 Claims, 6 Drawing Figures

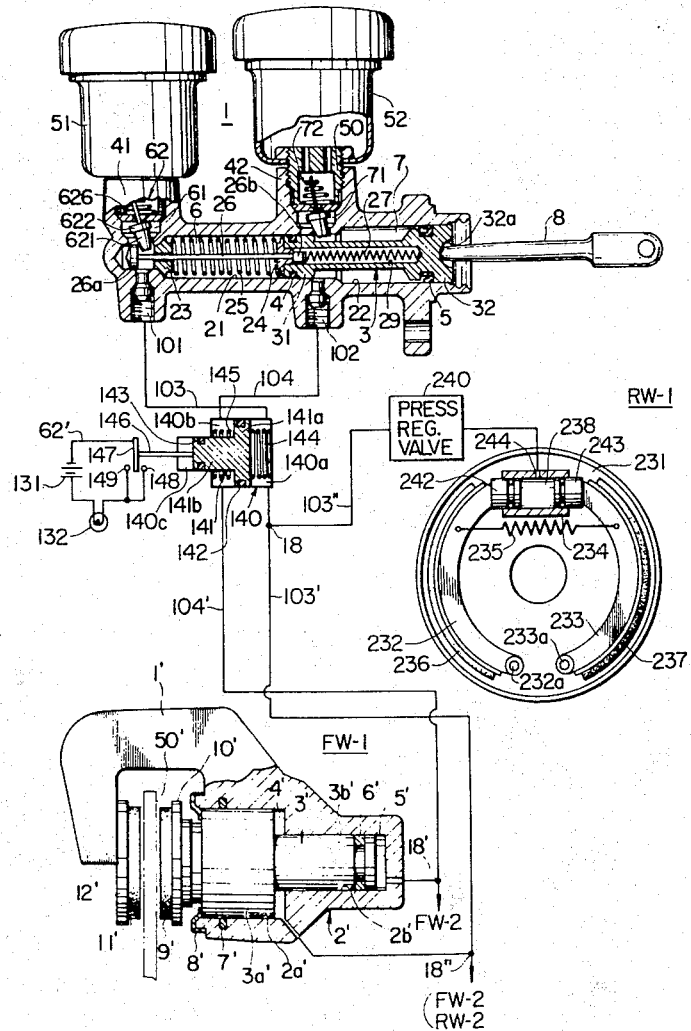

DUAL BRAKE SYSTEM

CROSS-REFERENCE TO RELATED APPLICATION

This application is a Continuation-In-Part application of my earlier co-pending application Ser. No. 141,316 filed May 7, 1971, now abandoned, by the same inventor which claims priorities from May 9, 1970 and May 26, 1970 based upon Japanese Patent Application Nos. 39456/1970 and 45063/1970.

BACKGROUND OF THE INVENTION

1. Field of the Invention

This invention relates to an improvement in and relating to a dual hydraulic brake system for braking the front and rear wheels of a powered automotive vehicle.

2. Description of the Prior Art

In the conventional type dual hydraulic brake system, the wheel brake cylinder is designed normally to have a unified axial bore which receives slidably first and second brake pistons. One end of the first piston projects from the related cylinder bore part and either carries on its projecting end rigidly a friction pad when the brake unit is of the friction disk type, or is cooperatingly connected with an expandable brake shoe. Between the inner end of said first brake piston and a second brake piston, a first hydraulic working or pressure chamber is provided within the bore of said brake cylinder. A second hydraulic working or pressure chamber is formed and maintained between the opposite end of the second brake piston and the related end wall of the brake cylinder, said second piston being kept, so to speak, in a kind of floating condition. Said first and second pressure chambers are independently and hydraulically connected through respective independent piping means with different hydraulic pressure sources formed in a conventional master cylinder, or suitably selected pressure liquid sources, so as to constitute a dual type hydraulic brake system.

Under circumstances, space adjusting means may be provided between said first and second brake piston means so as to properly correlate the both brake pistons. The purpose of the provision of the hydraulic piping and operating means in a dual manner as above referred to is, as commonly known to those skilled in the art to provide a substantially absolute guarantee of safety. With the whole brake system kept in its sound and effective condition for operation, the dual brake means are brought into a jointly cooperating condition so that the whole braking operation is carried into effect with use of the overall capacity and performance of the dual system. Should, however, one of the piping and operating element means become disabled by an accidental pipe burst or a similar dangerous cause, the remaining system can operate for brake application, thereby assuring a substantially absolute gurantee for brake actuating during travel of an automotive vehicle.

When considered the whole hydraulic brake system on an automotive vehicle, the dual brake system is generally employed for the front wheels, while the dual system is not employed generally for the rear wheels, mainly for economical reasons. In this case, the wheel cylinders of the rear wheels are hydraulically connected with a selected system of the dual brake system of the front wheels. According to practical experiences, such a semi-dual system provides acceptable reliability in the vehicle brake performance.

According to a generally employed practice, the effective working cross-sectional areas of the dual wheel cylinder for the front vehicle wheel have been designed to be equal to each other, from consideration of manufacturing as well as service benefits. As a modification therefrom, however, the cross-sectional area of one of the hydraulic pistons of the front wheel connected with the rear wheel brake system is selected to be substantially smaller than that of the remaining hydraulic piston of the same front wheel cylinder, for the purpose of providing the least possible change in the foot brake operating effort in case of accidental performance failure.

It has been found according to my practical experience that with use of either of said known semi-dual braking system, disadvantageous spin could appear frequently during vehicle braking, should the component system of the dual system which is not hydraulically connected with the rear wheel cylinders fail by accidental brake pipe burst or the like cause, resulting possibly in a rear wheel lock.

It is therefore, a main object of the invention to provide a dual brake system with which least possible change in the foot braking effort and stroke can be effected for actuation of the whole braking system of the vehicle, even in an accidental failure of either component system of the dual system.

A further object is to provide an improved dual brake system of the above kind, for avoiding possible wheel lock with either of the component systems disabled by accident.

On the other hand, it should be understood that the both brake system pressures of the dual type front wheel cylinder unit must be perfectly and hydraulically independent from each other, for positively and efficiently providing the dual brake purpose. More specifically, when considering the master cylinder or the like hydraulic pressure supply source as a starting point on the one hand and the wheel brake cylinder as the final point on the other hand, a perfect and durable sealing means must be provided between the first and the second pressure chambers, as above referred to provided in the wheel brake cylinder, so as to avoid any fluid communication disturbing the desirous independent operation of the dual system. On the other hand, when an oil leakage or burst should occur at the connection piping in either hydraulic system, the effect of the accident will influence the remaining, originally independent system. Thus, the fear may arise that in an accident of the above kind, the both hydraulic systems could be brought into inoperative conditions.

It is therefore strongly desired to detect an accidental failure of sealing performance of the sealing means provided the first and second pressure chambers of the above kind and instantly and rapidly indicate the occurence of the accident to the vehicle driver.

At this stage of description, a representative conventional sealing mode provided between the first and second pressure chambers and the conventional mode of detecting the operational failure of said sealing means will briefly be described hereinbelow.

As a representative, the second brake piston is provided with two separated sealing means, so as to provide an independent seal for the both independent pressure chambers. Further, the cylinder part attributed to the second piston, as a representative design, is provided with an axial groove extending over a certain distance within the range defined by and between the said two separated sealing means above referred to, said groove being kept in communication with the ambient atmosphere. Should any one of the both sealing means become leaky or ruptured, the pressure oil prevailing in the pressure chamber partially defined by the leaky or ruptured sealing means is led through said axial groove to the open atmosphere, thereby checking otherwise possible adverse effect upon the performance of the remaining sound and effective pressure chamber through the defective or ruptured sealing means and assuring, in effect, the braking performance of the overall hydraulic brake system. Such a failure of the sealing function through the occasionally invited defective or ruptured seal is alarmed normally by an oil quantity sensor provided at the oil supply source for detecting such failure by sensing the thereby invited reduction of oil quantity prevailing in the defective or disabled elementary hydraulic system, so as to alarm the accident to the vehicle driver.

It can be seen from the foregoing that in the conventional hydraulic wheel brake system, there must be provided at least two sealing means for interrupting fluid communication between the two originally and mutually independent hydraulic systems.

It is therefore a further object of the invention to provide a dual hydraulic brake system capable of reducing the number of said sealing means to one only, yet providing an effective overall braking operation when the both independent hydraulic systems are sound and effective and capable further of performing an independent braking action even when the sole sealing means should become leaky or even ruptured.

In the conventional dual hydraulic brake system, the provision of the axial groove results in a rather prolonged axial dimension of the second brake piston and in an increased quantity of oil contained in the hydraulic system. In addition, dust or the like foreign matter is liable to enter from open atmosphere into the interior of the hydraulic system through the open connection of the groove with atmosphere, should one of the dual systems be disabled by accidental pipe burst or the like cause.

It is a further object of the invention to provide a dual hydraulic brake system of the above-mentioned improved type, capable of obviating the provision of said conventional axial groove and of the open oil bleed connection thereof with open atmosphere.

A still further object of the invention is to provide an improved dual hydraulic brake system, allowing a fluid communication from the high pressure side hydraulic system to the low pressure side system, and indeed, through the said sole sealing means, so as to insure a proper functioning of the braking action with use of the effective and non-leaky hydraulic system, when one of the dual systems should fail to function by rupture or the like damage of the sole sealing means.

These and further objects, features and advantages of the invention will become more apparent when read the following detailed description of the invention by reference to the accompanying drawings illustrative of a preferred embodiment of the invention shown only by way of example.

In the drawings:

FIG. 1 is a schematic and partially sectioned view of the sole embodiment of the invention.

FIG. 2 is a sectional elevation of a valve assembly employed therein.

FIGS. 3 – 6 are several charts illustrative of several operational characteristics of the dual brake system according to this invention.

Referring now to the accompanying drawings, numeral 1 represents a master cylinder which is formed with a smaller diameter axial bore portion 21 and a larger diameter axial bore portion 22. A stepped piston, generally shown at 3, comprising a smaller diameter piston part 31 and a large diameter part 32 which are arranged to cooperate with said smaller and larger bore portions 21 and 22, respectively, said piston parts being made rigid with each other. Numerals 4 and 5 represent sealing means mounted on the said smaller and larger piston parts, respectively. Numerals 6 and 7 represent smaller and larger diameter cylinder chambers formed in the inner cylinder space corresponding to the said smaller and larger diameter cylinder bore portions as shown. By the provision of these sealing means 4 and 5, the cylinder chambers 6 and 7 are kept hydraulically independent from each other.

The outer end of the larger piston part 32 is formed with a reception recess 32a and exposed to outside atmosphere, a pusher rod 8 being kept at its inner end in pressure engagement with said recess 32a, while the outer end is linked with a footoperated brake pedal, not shown. When the driver depresses the pedal, axial urging force is transmitted therefrom through the pusher rod to the piston 3 which is thus urged to move axially and inwardly.

At the both ends of the forward smaller diameter hydraulic chamber 6, there are two spring retainers 23 and 24 of which that denoted 23 is positioned stationary, while that denoted 24 is attached to the outer end of the smaller piston part 31. A return coil spring 25 is provided under compression between these retainers 23 and 24, thereby the piston 3 being resiliently urged to move in the rightward direction in FIG. 1.

The piston 3 is formed with an axial blind bore 29 containing an elongated coil spring 27. A valve rod 26 slidably passes through the retainers 23 and 24, the inner end of said rod extending telescopically into said blind bore 29 and kept by its inner enlarged end 26b in pressure contact with the inner end of coil spring 27. Valve rod 26 is formed at its outer end with an enlarged part 26a. The inner enlarged rod end 26b is kept in pressure contact with the right-hand side of inner retainer 24.

Since the spring 27 has a substantially weak spring force relative to that of the return spring 25, piston 3 and valve rod 26 are normally arranged as shown in FIG. 1.

A first cylindrical upright and hollow projection 41 is formed integral with the main cylinder 1 in proximity to said enlarged rod end 26a. A similar second upright hollow projection 42 is formed integral with the main cylinder in proximity to the smaller piston part 31. These hollow projections 41 and 42 are formed respectively with passages 61 and 71 which are kept in hydraulic communication with the chambers 6 and 7, respectively, and provided with respective valve mechanisms 62 and 72. Referring to the right-hand valve mechanism 72, the latter is kept in position by means of a sleeve 50 which is threaded into the tapped upper part of said passage 71. To this sleeve 50, a liquid reservoir vessel 52 is fixedly attached as shown. The second or forward hollow projection 41 of the similar design is provided with similar valve mechanism 62 and a similar reservoir vessel 51 as mentioned above.

In FIG. 2, detailed structure of the first valve mechanism 72 is more specifically shown.

The passage 71 of the cylindrical projection 42 is formed with at least an inside circular shoulder 728 on which a disk plate 724 is mounted, said disk plate being centrally perforated at 725. The sleeve 50 extends downwardly and the lowermost end of the sleeve is kept in pressure engagement with the upper surface of the disk plate, thereby the latter being positioned fixedly on the shoulder 728. The valve member comprises a lower engageable projection 721, an intermediate flange 722 made integral therewith and an upwardly extending stem 727 which passes with ample plays through said central perforation 725. A spiral coil spring 726 surrounds the stem 727, the upper end of said spring being fixedly attached to the upper part of said stem by means of slot, pin or the like conventional attaching means and the lower end part of said spring being in kept pressure contact with the upper surface of disk plate 724. A resilient ring 723 is fixedly attached to the periphery of said flange 722. By virtue of the above structure of the valve mechanism 72, the resilient ring 723 is urged under the action of spring 726 to be kept in pressure contact with the lower surface of said disk plate 724. Thus, the valve mechanism 72 operates normally to establish fluid communication between the related reservoir vessel 52 and hydraulic chamber 7.

The second valve mechanism 62 has the similar structure as above. Members 621, 622 and 626 corresponds to 721, 722 and 726, respectively.

The respective on-service positions of these valve mechanisms 62 and 72 are as shown in FIGS. 1 and 2 and more specifically as follows:

When the pusher rod 8 is kept in its regular or off-service position as shown, the piston 3 is also kept at its regular or right-hand-extreme position.

The valve rod 26 is kept at its most extended position under the action of spring 27. Under these conditions, the respective engageable projections 621 and 721 of the valve mechanisms 62 and 72 are kept in contact with the enlarged rod end 26a and the inner shoulder end of the larger piston part 31, respectively, thereby the respective valve members being kept in their inclined position against the action of respective spiral coil springs 626 and 726, as representatively shown in FIG. 2.

Under off-service position of the brake system the reservoir vessels 51 and 52 are kept in fluid communication with respective hydraulic chambers 6 and 7, thus no hydraulic pressure being generated or accumulated in these chambers.

When the brake pedal is depressed, pusher rod 8 is moved leftwards in FIG. 1, the piston 3 is urged mechanically to move axially in the same direction. With this movement of the piston, the smaller piston part 31 is separated from contact with the engageable projection 721 of the first valve mechanism 72, thus the resilient ring 723 being brought into tight contact with the lower surface of the disk 724 and the hitherto established fluid communication between the reservoir vessel 51 and the pressure chamber 6 being positively interrupted.

Then, the second valve mechanism 62 is also actuated by the separation of rod end 26a from the engageable projection 621.

With further leftward and forward movement of the piston 3, hydraulic pressures are generated and accumulated in the respective pressure chambers 6 and 7 and delivered therefrom through respective outlet sockets 101 and 102, respectively, to brake pipes 103 and 104.

With the aforementioned forward movement of the piston 3, valve rod 26 acts at first upon the valve mechanism 62, but, substantially instantly thereupon, the enlarged rod end 26a is brought into collision against the front end wall of the cylinder 1 and prevented from its further movement.

With further advancing mvoement of piston 3, the right-hand or inner end of valve rod 26 will telescopically invade into the blind bore 29 against the action of spring 27. Upon release of the foot pressure from the brake pedal, all the movable constituents are returned to their original position shown in FIG. 1.

In the conventional comparative master cylinder, a valve actuating member corresponding to the valve rod 26 adapted for actuation of the forward or second valve mechanism is made integral with the stepped main piston and thus, it must continue its forward movement together with the main piston, even upon the execution of valve-closing operation for the forward or second valve mechanism for interruption of the fluid communication between the related liquid reservoir and the related cylinder chamber. This further advancing movement of the valve operating member will necessarily bring out a correspondingly increased occupying space by the master cylinder assembly. By adopting the aforementioned telescopic arrangement of the valve operating member relative to the main piston, such additional and excess movement of the said member can be dispensed with, thereby a substantial decrease in the axial length of the master cylinder assembly being realized with equal operating efficiency thereof.

Although the embodiment shown and described in the foregoing, the outlet socket 101 has been arranged to direct in the perpendicular direction to the axis of the master cylinder assembly, it may be modified so as to direct axially as in the case of the free piston type master cylinder by slightly modifying the rod end 26a and the forward end wall of the main cylinder 1.

In the foregoing embodiment parts, the number of the hydraulic cylinder chambers was only two, but in practice, the principles of the present invention could be well applied to such modified master cylinder assembly as having more than two cylinder chambers, although such modification has been omitted from the specification and drawings by virtue of its very obviousness over the foregoing representative embodiment parts of the master cylinder.

A compensator comprises a stepped hydraulic cylinder 140 which comprises in turn a larger diameter part 140a, 140b and a small diameter part 140c made rigid with each other, and a stepped piston 141 having a larger diameter piston part 141a and a smaller diameter piston part 141b made rigid with each other is slidably mounted therein, respectively. In this way, two separated larger diameter liquid chambers 140a and 140b are formed at the both sides of said larger piston 141a, while the smaller diameter chamber 140c is formed exclusively at the left-hand side of said smaller piston 141b within the interior of said stepped cylinder 140. The first brake pipe 103 opens at the right-hand side larger cylinder chamber 140a and the second brake 104 opens at the left-hand larger cylinder chamber 140b. Although not shown, the chamber 140c communicate with open atmosphere through at least an air port, not shown.

Spring 144 is inserted between the right-hand casing end wall of the cylinder 140 and positioned, therefore within the larger chamber 140a. A further spring 145 is inserted between the left-hand end wall of the larger cylinder and larger piston 141a and positioned therefore within the left-hand side larger chamber 140b. For separating sealingly between the chambers 140a and 140b, the larger piston 141a is provided with a sealing ring 142. Smaller piston 141b is provided with a sealing ring 143 for sealing off the piston against atmospheric air.

A stem 146 made rigid with the smaller piston part 141b extends horizontally and centrally therefrom through the related smaller cylinder end wall to the exterior thereof into the open atmosphere and carries fixedly a movable contact 147 fixedly mounted at the free end of said stem 146. With the piston 141 positioned, as shown, it is neutral position, the movable contact 147 is positioned between a pair of stationary contacts 148 and 149 without contacting therewith. An electric lead 62' extends from movable contact 147 through battery 131 and alarm lamp 132 to stationay contacts 148 and 149 arranged in parallel to each other.

In FIG. 1, a front disk brake unit FW-1 is shown wherein numeral 1' represents a conventional calliper which straddles, a brake disk 50' shown only schematically and partially in chain-dotted line on account of its very popularity. This brake disk 50' is so arranged that it rotates, as commonly known, in unison with an automotive vehicle wheel when the vehicle is running.

A hydraulic brake cylinder 2' rigid with calliper 1' is of a stepped design and comprises a larger diameter part 2a' and a smaller diameter part 2b'. A stepped hydraulic piston 3' comprising a larger part 3a' and a smaller part 3b' is slidably mounted in the cylinder 2'. A first and ring-shaped pressure chamber 4' is formed between the right-hand end of larger piston part 3a' and the corresponding end wall of larger cylinder part 2a'. A second pressure chamber 5' is formed between the right-hand end of smaller piston part 3' and the corresponding end of smaller cylinder part 2b'.

Sealing ring 6' is provided between a smaller cylinder part 2b' and smaller piston part 3b', preferably on the latter as shown, for interruption of a fluid communication between first and second pressure chambers 4' and 5'. A further sealing ring 7' is provided between larger cylinder part 2a' and larger piston part 3a', preferably on the latter as shown for interruption of fluid leakage from the first pressure chamber 4' to outside.

Numeral 8' represents a ring-shaped resilient dust cover made of soft rubber or plastic material, one end thereof being fixedly attached to the left-hand end of larger cylinder part 2a' and the other end thereof being fixedly attached to the left-hand end of larger piston part 3a', although the attaching means are not shown specifically on account of its very popularity and for simplicity of the drawing.

A friction pad 9' made of a friction- and heat resistant material, such as is rigidly attached to a carrier 10' which is rigid with the outer end of larger piston part 3a'. A further friction pad 11' made of same friction- and heat resistant material, is rigidly attached to a carrier 12' which is rigid with calliper 1'. As shown, these pads 9' and 11' are arranged in opposition to each other and provide normally with respective small idle gaps relative to brake disk 50' when the brake cylinder unit so far shown and described is in its off-service position.

Brake pipe 103 extends through the chamber 104a into that shown at 103' which leads to the chamber 4' and branches at an intermediate point 18 off to that denoted 103''. Pipe 103' extends through a junction point 18'' to the larger liquid chamber 4' of the front wheel cylinder unit FW-1. Brake pipe 104 extends through the chamber 104b into that denoted 104' which leads at the same time through a junction point 18' to the smaller chamber 5', of the same front wheel cylinder disk brake unit FW-1. Junction point 18' leads at the same time to the smaller liquid chamber similar of other front wheel disk brake unit FW-2, not shown.

Rear brake unit RW-1 constructed into a leading-trailing shoes type drum brake comprises a stationary backing plate 231, a leading shoe 232 pivotably mounted thereon at 232a, a trailing shoe 233 pivotably mounted again on the plate 231 at 233a, a wheel brake cylinder 234 and a return spring 235 resiliently connecting the both shoes 232 and 233 in the mutually attracting direction.

Shoes 232 and 233 carry thereon respective friction elements 236 and 237 which, when brake force is applied as will be described more in detail hereinafter, are arranged frictionally to cooperate the inside wall surface of a brake drum concentrically arranged with backing plate 231 and to rotate in unison with one of the rear vehicle wheels, although not shown for purposes of clarify of the drawing and on account of their very popularity. Normally, however, respective proper idle gaps are maintained between the friction elements 236 and 237, on the one hand, and the brake drum, on the other hand.

Wheel cylinder 234 is formed with a sole axial bore 238 acting as the hydraulic chamber receiving slidably two opposite type brake pistons 242 and 243. The exposed outer end parts of pistons 242 and 243 are kept in pressure contact with the upper ends of brake shoes 232 and 233, respectively.

Pressure chamber 238 is hydraulically connected through a port 244 drilled through the corresponding cylinder wall, with the branch brake pipe 103'' through a conventional pressure regulator valve unit 240.

Junction point 18'' extends in parallel to 4', although not specifically shown, to the similar pressure chamber to 238 of other drum brake unit RW-2 through a further conventional pressure regulator valve unit designed and arranged in the similar way to that denoted 240, although not specifically shown only for simplicity.

When the brake pedal is actuated, braking liquid is discharged from respective outlet ports 101 and 102 into the first and second brake pipes 103 and 104, respectively, the delivery ratio between the both being 1.6 : 1 – 2.2 : 1 responsive to the effective cross sectional areas at 21 and 22. The reason for adopting this range of brake liquid discharge ratio will be more fully described hereinafter.

At this stage, it should be mentioned that the ratio 2.2 : 1 may be further reduced theoretically, but in such case, one of the both master chambers as at 22 would be in practice too small to be accepted for execution of effective hydraulic braking action, should the other or first system component starting from the other master chamber 21 should fail to keep its pressurized condition by virtue of occasional occurence of pipe burst or the like accidental cause. In this case, the effective or liquid pressure maintaining system component, the first one in the present specific embodiment shown, could be subjected to an unacceptably high liquid pressure which affects adversely upon scaling means provided in the effective system component.

The discharged braking liquid discharged from the respective first and second outlets 101 and 102 is conveyed through the brake pipes 103 and 104 to the larger and smaller working chambers 140a and 140b, of pressure compensator 140. The first system component includes effectively larger working chamber 6, outlet 101, brake pipe 103, larger working chamber 140a of compensator 140, pipes 103' and 103'', regulating valve 240, larger working chambers 4' of two front wheel brake cylinder units FW-1 and FW-2 and two working chambers 238 of rear wheel brake cylinders RW-1 and RW-2. On the other hand, the second system component includes the effectively smaller working chamber 7 of master cylinder, outlet port 102, brake pipe 104, smaller working chamber 140b of pressure compensator 140, pipe 104' and two smaller working chambers 5' of front wheel brake cylinders FW-1 and FW-2.

Therefore, by actuation of the brake pedal, all the front and rear brake units FW-1, FW-2, RW-1 and RW-2 are brought into actuation.

The effective cross-sectional ratio between the larger and smaller working chambers 6 and 7 is selected to the aforementioned range so as to discharge the braking liquid in the ratio to be consumed regularly in the respective system component. In the regular braking mode, the compensator piston 14' moves only slightly, so as to keep the stem 146 and movable contact 147 in its off-alarm position shown in FIG. 1.

The hydraulic pressure prevailing in the pipes 103; 103'; 103'' on the one hand, and in the pipes 104; and 104' on the other hand, upstream as well as downstream of the pressure compensator 140, are mutually in reverse ratio between the cross-sectional areas at larger and smaller working chambers 140a and 140b of the compensator. The cross-sectional ratio is set to 1 : 1.2 – 1 : 1.6. The reason for this specific selection will become more apparent as the description proceeds.

The braking ratio between the front wheel and rear wheel is set to establish 60–80 percent, most preferably 70 percent at the front, and 40–20 percent, most preferably 30 percent at the rear, as acknowledged most effective among those who are skilled in the art.

If the first system 103; 103'; 103'' component should fail by pipe burst or the like cause, the front and rear wheel brake working chambers 4' and 238 will become ineffective, thus the wheel braking action being brought about by the actuation of the smaller front wheel braking working chambers 5' only.

By the pressure failure in the first system component 103; 103'; 103'', the apparently larger, effectively smaller master working chamber 7 only functions in the wheel braking service in which a substantially higher hydraulic pressure than usual will be supplied from the effective working chamber 7 through its outlet 102 to the second system component 104; 104'; 104'', even when assuming an equal degree of brake exerting effort has been applied to the pedal. In this case, the compensator piston 141 will be hydraulically moved rightwards in FIG. 1 against the action of balancing spring 144, thus the movable contact 147 being brought into cooperation with stationary contact 148, so as to ignite alarm lamp 132. In this case, it is further acknowledged that the maximum possible vehicle deceleration degree capable of being effected without fear of wheel lock depends exclusively upon the dynamic weight of the front axle, not shown, irrespective of the front and rear wheel brake cylinders, the regular deceleration being normally 0.5–0.6 g, when g stands for gravity acceleration. In the present assumed example, the rear wheel brake cylinders RW-1 and RW-2 and the larger working chambers 4' of front wheel brake cylinders FW-1 and FW-2 are in fail, substantially higher hydraulic pressure must be applied from the effective master chamber 7 to the effective smaller working chambers 5' of front wheel brake cylinders FW-1 and FW-2. Even in this case, substantially same vehicle speed deceleration degree is aimed at with the same braking effort applied to the pusher rod 8 through the brake pedal and the cross-sectional area of the effectively smaller working chamber 7 has been correspondingly dimensioned so as to satisfy this demand.

On the contrary, when another system component 104; 104' should fail to maintain its pressurized state by pipe rupture or the like cause, the liquid pressure delivered from the master cylinder is supplied exclusively to the larger working chamber 140a of the compensator, thereby the compensator piston 141 being moved leftwards in FIG. 1. By this piston movement, movable contact 147 is brought into contact with stationary contact 149, thereby alarm lamp 132 being ignited for alarming. In this case, pressure liquid is conveyed from the effective larger master chamber 6 through outlet 101; pipe 103, chamber 140a and pipe 103' to the larger working chamber 4' of front wheel brake cylinders FW-1 and FW-2, as well as to the working chambers 238 through the pipes 103' and 103''. In this case, by virtue of the partial failure at the front wheel brake cylinders, the braking ratio is made larger than in the regular operational period, at the rear wheel brake cylinders at RW-1 and RW-2. By this reason, rear wheel lock may liably happen rather than the regular brake operation period. It is desirable, also in this case, to set the wheel deceleration degree substantially to 0.5–0.6 g as before. Therefore, the effective cross-sectional area of the working chamber 4' must be selected to be as large as possible so as to make the relative ratio between the braking forces at the front and the rear wheels as similar to that obtainable during the regular braking period. In order to satisfy this operational condition, it is preferable to set the ratio of cross-sectional areas between the larger and smaller working chambers 4' and 5' at each of the front wheel brake cylinders FW-1 and FW-2 to 1.5 : 1 or so. When, however, considering vehicle sizes and various heights of center of gravity variable with vehicle models and vehicle sizes, the ratio must preferably be within the range of 1.5 : 1 – 2 : 1.

As was already referred to hereinbefore, there are provided several seals as at 4; 142 and 6' effectively and hydraulically sealing the first system component off from the second one. When any one or other of these seals should fail to function as such, the results would always be similar and thus, such representative case where the seal 6' should have been failed to effectively function during a brake applying period.

With failure of the seal 6', the normally higher braking liquid pressure prevailing in the smaller working chamber 5' will become equalized with the normally lower liquid pressure prevailing in the larger working chamber 4', thus the both system components 103; 103'; 103'' and 104; 104' representing a certain common liquid pressure and the compensator piston 141 being moved leftwards in FIG. 1. By this leftward movement of the compensator piston, contacts 147 and 149 are brought into mutual contact for igniting the alarm lamp 132.

In order to realize the aforementioned alarming operation upon the occasional and accidental establishment of liquid pressure equalization between the first and second system components, the compensator working chambers connected with the respective system components must have mutually different effective cross-sectional areas. With too much high cross-sectional ratio therebetween, the second system component must have an unacceptably high working pressure as affecting adversely upon rubber or the like sealing means and horse elements occasionally employed as the parts of the related system component. Or conversely, when the ratio be nearly unity, thus representing only slight cross-sectional difference between the related two working chambers, the compensator piston will find its difficulty in the alarming operation, even when the hydraulic pressures in the both system components should become equalized accidentally.

According to my practical experiments for finding out a compromise between these contradicting demands, the cross-sectional ratio must preferably be set to within a range of 1:1.2 to 1:1.6.

When it is tried to set the cross-sectional ratio between the smaller and larger working chambers of the front wheel brake cylinder by considering such a first demand that upon pressure failure of either system component, maximum deceleration degree as attainable without fear of invitation of wheel lock must preferably be maintained, and to set the cross-sectional ratio between the effectively smaller and larger working chambers 7 and 6 of the master cylinder by considering such a second demand that upon similar pressure failure as above, similar degree of deceleration may be attained with same pusher rod actuating force, the compensator could not always represent such feature that it serves at its substantially central or neutral position for pressure compensation. Since, however the required liquid quantity for each of the system components depends naturally upon the working pressure the stroke of the compensator piston 141 may be set to a possible minimum by selecting the working pressure in the first system component 103; 103'; 103'' which utilizes a larger amount of liquid for brake operation, to a lower as possible level. It is thus sufficient to set the liquid pressure ratio between the both system components in such way that the necessary liquid quantities of the both are equal to the liquid discharges from the respective working chambers of the master cylinder, yet under preservation of the aforementioned range of cross-sectional ratio: from 1:1.2 to 1:1.6 adapted for the determination of the compensator's working chambers.

In FIG. 3, an experimental operation chart of a practical embodiment of the hydraulic braking system of the present invention.

Main effective cross-sectional dimensions for the first system component were:

| | |
|---|---|
| front wheel brake cylinder | 10.8 cm$^2$; |
| master cylinder | 2.22 cm$^2$; |
| compensator | 1.54 cm$^2$; |
| rear wheel brake cylinder | 2.85 cm$^2$ |

Main cross-sectional dimensions for the second system component were:

| | |
|---|---|
| front wheel brake cylinder | 7.15 cm$^2$; |
| master cylinder | 1.14 cm$^2$; |
| compensator | 1.13 cm$^2$; |

On this chart, it will be clearly seen that with increase of braking effort applied to the master piston, the liquid pressure $P_2$ in the second component, the liquid pressure $P_2$ in the first system component and the $P_3$ appearing downstream of pressure regulating valve 240 show respective increase.

The master cylinder stroke increases naturally in response to the applied brake force or effort.

The compensator piston stroke varies within a highly limited range, more specifically plus/minus 0.5 mm above and below the horizontal base line 0 — 0 over the whole variation range of the braking effort applied to the master piston. This means such that selection of the cross sections for master cylinder, front wheel brake cylinder and rear wheel brake cylinder were highly proper and thus, the compensator piston 141 fluctuates only within a highly limited stroke range under the whole operational range of the master cylinder.

The alarm lamp 132 is so arranged that it ignites when the compensator piston 141 moves more than 3 mm from its neutral position by switching on in the manner already referred to hereinbefore. Thus, under the normal operation of the hydraulic braking system shown and described so far, the alarm lamp does not ignite.

In FIG. 4, a further operation chart is shown for the illustration of pressure failure at the second system component.

In this case, the compensator piston performs its full stroke movement as was referred to hereinbefore, the full stroke length being 3 mm, so as to ignite the lamp 132, for alarming the pressure failure under consideration.

At the braking force of 200 kg. applied to the master piston, the pressure $P_2$ increases from 50 kg/cm$^2$ under normal operation shown in FIG. 3 to 85 kg/cm$^2$ in the present case shown in FIG. 4. This illustrates that according to a feature of the present invention, a substantially higher working liquid pressure prevails in the effective system component upon accidental occurence of pressure failure in either of the system components, than that appearing in the regular satisfying braking mode shown in FIG. 3.

As for the piston stroke variation, it becomes longer value about 18.5 mm in FIG. 4 in comparison with the regular value of about 11 mm in FIG. 3, when observing at a braking effort of 200 kg applied to the master cylinder, thus showing a rather short, lost stroke : 7.6 mm of the master piston.

With frequently used free piston type master cylinder, the lost motion stroke of the master piston may amount normally to 13 - 17 mm which means naturally a rather appreciable defect to be obviated.

In FIG. 5, a similar operation chart is shown wherein the first system component became disabled by the loss of hydraulic working pressure. It will be seen equally in this case that the effective working liquid pressure available in and from the effective working chamber of the master cylinder is increased at the same braking effort as applied to an appreciably higher value than that appearing in the regular braking mode shown in FIG. 3. A rather shorter lost motion stroke of the master piston may also be observed. The compensator piston makes again its full stroke motion, yet in the reverse direction as that performed in the case shown in the foregoing FIG. 4, so as to ignite the alarm lamp 132.

In FIG. 6, a further similar operation chart is shown where a seal as at 6' serving for establishing a fluid communication interruption between the first and second system components has been broken and thus, an appreciable inside or intercomponental fluid leakage occurred.

By this substantial inside fluid leakage between the both system components, the both working pressures $P_1$ and $P_2$ were equalized. In this case, the compensator piston deviates from its regularly operating, substantially neutral position by its full stroke, with substantial increase of the braking effort applied to the master piston, thereby bringing the alarm lamp 132, FIG. 1, to ignite for issuing visual alarm signal. As for the working liquid pressures at various places of the whole dual brake system, there are no substantial difference from those obtainable with the regular working mode shown in FIG. 3, because in this case, all the working chambers do not lost their liquid pressure.

In this case, also, it may be well observed that a lost motion stroke of the master piston applied with equal braking effort is rather short to an acceptable degree.

It will be further observed that in this case where an inside or intercomponental seal breakage has accidentally occurred, any liquid leakage to outside of the system can be effectively prevented and only a so-to-speak inner leakage takes place which can be, however, detected in a reliable and positive manner as illustrated above and constitutes a further feature of the present invention.

The embodiments of the invention in which an exclusive property or privilege is claimed are as follows:

1. A dual hydraulic brake system for a powered vehicle having two front wheels and two rear wheels, said system comprising first and second mutually independent hydraulic brake systems operable by a single manual braking means, said system comprising:

a master cylinder having a stepped bore defining a larger diameter bore portion and a smaller diameter bore portion and a stepped piston slidably mounted in said bore defining mutually and hydraulically independent larger and smaller working chambers within the stepped bore having a relative cross-sectional ratio of 1: 1.6 - 1:2.2;

a pressure compensator having a stepped bore defining a larger diameter bore portion and a smaller diameter bore portion and a stepped piston normally resiliently balanced and slidably mounted in said stepped bore defining mutually and hydraulically independent larger and smaller working chambers having different effective cross-sectional areas, the relative ratio therebetween being 1 : 1.2 - 1:1.6;

a front wheel brake cylinder for each of said front wheels, having mutually and hydraulically independent larger and smaller working chambers, the relative ratio between their effective cross-sectional areas being 1 : 1.4 - 1 : 2;

a rear wheel brake cylinder for each of said rear wheels, having a sole working chamber;

said first hydraulic brake system including said larger working chambers of said master cylinder, said compensator and front brake cylinders and the working chambers of said rear wheel brake cylinders; and said second hydraulic brake system element including said smaller working chambers of said master cylinder, said compensator and said front wheel brake cylinders, whereby the working hydraulic pressure prevailing in said first system element being lower than that prevailing in said second system element under normal braking conditions.

2. The dual hydraulic brake system as claimed in claim 1, further comprising an electric alarm means operatively connected with the piston of said compensator and a functional sole seal means provided between the two independent working chambers of said master cylinder, said compensator and each of said front wheel brake cylinders, respectively, for assuring hydraulic interruption between said both system components, there being no otherwise provided relief means to atmosphere positioned between each pair of the said working chambers, thereby equalizing the higher and lower hydraulic pressure prevailing in said both system components upon occurence of sealing failure at any one of said seal means by the thereby caused movement of the piston of said compensator, and deliverying an alarm signal by detecting said seal failure in the form of an inter-system-componental liquid leakage.

3. The dual hydraulic brake system as claimed in claim 1, wherein each of the front wheel brake cylinder is provided with a stepped piston.

* * * * *

UNITED STATES PATENT AND TRADEMARK OFFICE
CERTIFICATE OF CORRECTION

PATENT NO. : 3,885,392
DATED : May 27, 1975
INVENTOR(S) : TETSUO HARAIKAWA

It is certified that error appears in the above-identified patent and that said Letters Patent are hereby corrected as shown below:

Page 1 (Cover Page)

After the inventor's name insert the following paragraph:

--Assignee: Tokico Limited, a Japanese Corporation,

Kawasaki-shi, Kanagawa-ken, Japan--

Signed and Sealed this twenty-fifth Day of May 1976

[SEAL]

Attest:

RUTH C. MASON
*Attesting Officer*

C. MARSHALL DANN
*Commissioner of Patents and Trademarks*